US006657978B1

(12) United States Patent
Millman

(10) Patent No.: US 6,657,978 B1
(45) Date of Patent: Dec. 2, 2003

(54) OPTIMIZED INTEGRATED HIGH CAPACITY DIGITAL SATELLITE TRUNKING NETWORK

(75) Inventor: Richard M. Millman, McLean, VA (US)

(73) Assignee: Transworld Communications (USA), Inc., McLean, VA (US)

( * ) Notice: Subject to any disclaimer, the term of this patent is extended or adjusted under 35 U.S.C. 154(b) by 0 days.

(21) Appl. No.: 09/064,900

(22) Filed: Apr. 23, 1998

(51) Int. Cl.[7] .............................. H04B 7/04; H04B 7/15
(52) U.S. Cl. ...................... 370/316; 370/319; 370/320; 370/343; 370/344; 370/466; 370/480
(58) Field of Search ................................ 370/277, 279, 370/281, 293, 295, 316, 319, 320, 343, 344, 466, 480; 455/3.02, 3.04, 3.05, 427, 7, 17, 20, 62, 73, 88, 118

(56) References Cited

U.S. PATENT DOCUMENTS

| 4,720,873 A | 1/1988 | Goodman et al. ............ 455/2 |
| 5,081,703 A | 1/1992 | Lee ............................. 455/13 |
| 5,276,904 A | 1/1994 | Mutzig et al. ............... 455/3.2 |
| 5,283,639 A | 2/1994 | Esch et al. .................... 348/6 |
| 5,303,393 A | 4/1994 | Noreen et al. ............... 455/3.2 |
| 5,392,450 A | * 2/1995 | Nossen ....................... 455/12.1 |
| 5,424,770 A | 6/1995 | Schmelzer et al. ........... 348/9 |
| 5,455,823 A | 10/1995 | Noreen et al. |
| 5,581,268 A | * 12/1996 | Hirshfield ................... 343/853 |
| 5,615,407 A | 3/1997 | Barkats ...................... 455/13.1 |
| 5,633,891 A | 5/1997 | Rebec et al. ................ 375/219 |
| 6,067,442 A | * 5/2000 | Wiedeman et al. ........ 455/13.1 |

* cited by examiner

Primary Examiner—Hassan Kizou
Assistant Examiner—Joe Logsdon
(74) Attorney, Agent, or Firm—Roberts Abokhair & Mardula, LLC

(57) ABSTRACT

An optimized integrated high capacity digital satellite trunking network, otherwise known as the Multipurpose Wideband Communications System (MPWCS) and method to link multiple earth stations in the same or different satellite antenna transponder footprints using uplink frequency to select the downlink footprint. The configuration of the network eliminates the need to reconfigure the transponder based on the desired downlink footprint. The invention integrates wideband receivers and hybrid signal combiners on the satellite along with an appropriate uplink and downlink frequency plan to provide the ability to reconfigure connectivity between uplink and downlink footprints based on uplink frequency selection. Certain configurations allow single hop connectivity between all transponder antenna footprints for all users within those footprints of the geostationary satellite. The system uses the full power and bandwidth of the constituent communications satellites for all services without dividing the power or bandwidth among multiple networks.

16 Claims, 12 Drawing Sheets

OPTIMIZED INTEGRATED HIGH CAPACITY DIGITAL SATELLITE TRUNKING NETWORK

FIELD OF THE INVENTION

This invention relates generally to the field of satellite communication. More specifically the present invention is an optimized integrated high capacity digital satellite trunking network system, otherwise known as the Multipurpose Wideband Communications System (MPWCS) and method for linking multiple earth stations in the same or different antenna transponder footprints of the same satellite at the greatest efficiency in use of power and bandwidth, thereby eliminating the need to reconfigure the satellite transponder based on the desired downlink footprint.

BACKGROUND OF THE INVENTION

Geostationary satellites provide flexible communication relay service using earth stations and satellite transponders, with satellites supporting point-to-multi-point relay service between earth stations. Satellite operators typically lease transponder capacity based upon power, bandwidth, connectivity, and coverage desired by lessees. The leasing of power, bandwidth, connectivity and coverage of the satellite in a non-optimum manner due to the sharing between different user networks results in less than the maximum satellite power and bandwidth being utilized. Further, networks have been historically developed by separate organizations responsible for provision of space segment and earth segment leading to a complex definition of interfaces and less than the highest efficiency in the total capacity which can be derived from the satellite orbit and frequency spectrum which has been assigned. Depending on a number of satellite design parameters (e.g. uplink and downlink frequencies, antenna type, antenna boresight, antenna size, and transmitter power of the satellite) the effective "earth footprint" of a satellite transponder has geographic limits. The geographic limits of the transponder footprint constrain the type of relay service that may be provided.

For two users that are within the same satellite transponder footprint who desire to establish a communication link, a usual and simple form of simplex service requires that the transmitting user point its earth terminal antenna at the relay satellite and transmit on an uplink frequency. Using a satellite antenna whose receive footprint includes the earth station location of the transmitting user, the satellite transponder receives the uplink frequency, translates the frequency to a downlink frequency, amplifies the signal and then re-transmits the translated and amplified signal through the same satellite antenna used to receive the signal. The downlink signal can be received by any earth terminal that is within that satellite antenna footprint. Depending on the downlink frequency, and the previously mentioned physical characteristics of the satellite, the downlink footprint may be as small as a few hundred miles in diameter or up to several thousand miles in diameter. For two users who are within the same satellite antenna footprint, this form of relay service is very effective.

For two users who are not within the same satellite antenna footprint, but are within the satellite antenna footprint of another antenna on the same satellite, other techniques are used. One technique involves providing an electronic "cross-strap" between two antennas/transponders on the same satellite. In this arrangement, the uplink signal from the earth transmitting station is received by one satellite antenna and the signal is translated and amplified for re-transmission by another satellite antenna, whose footprint includes the desired receiver. Using this technique, two users who are physically distant from each other and are each within small and different satellite antenna footprints of the same satellite may use a single satellite for relay service.

The problem with cross-strapping is the tied transponders remain dedicated to each other for as long as the strap remains in place. Thus, all of the signals received by the tied receiving transponder are directed to the tied downlink transponder and to the antenna associated with that transponder. If the uplink transponder and downlink transponder are not fully utilized, strapping results in unused satellite capacity and inefficient use of resources.

Various attempts have been made to address different aspects of these problems. Examples include U.S. Pat. No. 5,615,407 to Barkats, U.S. Pat. No. 4,720,873 to Goodman et al., U.S. Pat. No. 5,283,639 to Esch et al., U.S. Pat. No. 5,081,703 to Lee, U.S. Pat. No. 5,276,904 to Mutzig et al., U.S. Pat. No. 5,455,823 to Noreen et al., U.S. Pat. No. 5,633,891 to Rebec et al., U.S. Pat. No. 5,424,770 to Schmelzer et al., and U.S. Pat. No. 5,303,393 to Noreen et al.

What is needed is a satellite network that utilizes all of the available power and bandwidth of a satellite or a fleet of satellites and that permits communications to occur among users whether using the same or different communication protocols.

SUMMARY OF THE INVENTION

It is therefore an object of the present invention to create a satellite network optimized to use the full power and bandwidth of the constituent satellite, thereby providing highest capacity for operation of a digital trunking network based on the integration of the earth stations and satellite for maximum transmission efficiency.

It is a further objective of the present invention to create a high capacity satellite communications network where usage is measured by time (minutes-of-use) rather than by power or bandwidth leased by a party.

It is yet another objective of the present invention to create a global digital high capacity telecommunications network using the full power and bandwidth of multiple constituent satellites for any communications services within the field-of-view of the satellite network.

It is a further objective of the present invention to integrate multi-service satellite telecommunications using the full power and bandwidth of constituent satellites for all communications.

It is yet another objective of the present invention to provide voice, data, facsimile, video and general bit stream service using the full power and bandwidth of constituent satellites for all communications.

It is a further objective of the present invention to provide public switched telephone network services using the full power and bandwidth of constituent satellites for all communications.

It is yet another objective of the present invention to provide private branch exchange services to selected groups of users using the full power and bandwidth of constituent satellites for all communications.

It is a further objective of the present invention to provide overlay network services to selected groups of subscribers using the full power and bandwidth of constituent satellites for all communications.

It is yet another objective of the present invention to provide domestic and international telecommunications service using the full power and bandwidth of constituent satellites for all communications.

It is a further objective of the present invention to link telecommunication services of the present invention with other communications service providers and carriers.

It is yet another objective of the present invention to link telecommunication services of the present invention with other terrestrial telecommunications providers and carriers.

It is a further objective of the present invention to provide telecommunications services using the full power and bandwidth of constituent satellites for all communications when data being transmitted is either standard or non-standard telecommunications protocols such as but not limited to; ATM, frame relay, Internet, XDSL, IP, and/or mobile telecommunications protocols.

It is yet another objective of the present invention to provide protocol conversion between different standards of communications between countries and within a single country using multiple protocols.

It is still another object of the present invention to allow a user within the satellite antenna footprint of one satellite transponder to flexibly communicate with other users who are within the same or other satellite antenna footprints of a single satellite by using the uplink frequency to selectively select between users and satellite antenna downlink footprints without the need to reconfigure the satellite transponders.

It is another object of the present invention to provide this flexible communication capability for wideband high data rate communication.

An embodiment of the present invention, hereinafter referred to as MPWCS, generally comprises three spacecraft each of which is in a geosynchronous orbit at three orbital locations. Interacting with the three spacecraft are high-capacity digital earth stations. The digital modulation used is phased shift keying (PSK) and specifically 8-PSK modulation for highest bandwidth efficiency. The use of PSK dramatically increases the channel capacity in bits per Hz which can be carried within a given amount of bandwidth.

Relatively large diameter earth station antennas are used to maximize the efficiency with which satellite power is used, for example and without limitation 9 meter antennas are currently used. Further, each earth station has a relatively large high power amplifier to insure communication links are not uplink-power limited. For example and without limitation 350 watt amplifiers are currently used. Digital modems are used for all services to be supported by the system of the present invention. Compression technology is also used within the earth segment to take advantage of silent periods within a voice conversation, statistical utilization of speech activity among multiple voice channels and redundancy within individual voice channels to allow the available satellite communications bandwidth to be allocated to the largest number of voice channels consistent with maintaining high quality and consistent with meeting national and international standards where appropriate.

In a conventional satellite system, when a transponder is illuminated by multiple signals occupying different bands or channels, additional guard bands are imposed between the channels to minimize interference. The additional guard bands consume bandwidth thereby reducing the efficiency of the transponder utilization. In an embodiment of the present invention, a transponder is limited to a single carrier permitting the full bandwidth and power of the transponder to be utilized. In another embodiment, all of the transponders on the satellite are so limited thereby maximizing the power and bandwidth utilization of the satellite.

Finally, protocol conversion is implemented throughout the system so that communications using dissimilar protocols can be converted from one to another. This allows communication from regions or countries using dissimilar protocols to occur in a continuous and seamless manner. Taken together these characteristics result in a high-capacity satellite based digital trunking network.

The present invention overcomes the disadvantages of the prior art through: a) integration of earth and space segments for maximum capacity and efficiency using the available satellite orbit and frequency allocations, and b) providing integrated digital service to users on an end-to-end basis from switching center to switching center location. Further, a combination of multiple antennas and transponders on the same satellite, are linked to hybrid signal combiners, wideband receivers, and hybrid signal splitters on the satellite that are able to use a contiguous portion of both the uplink and downlink frequency spectrum. In one embodiment, the present invention uses two transponders with wideband receivers and two 80 MHZ bandwidth portions of the frequency spectrum separated by 64 MHZ to allow a user to flexibly connect an 80 MHZ bandwidth signal between two satellite antenna footprints.

In another embodiment of the present invention, a multiplexer is also used to interconnect multiple transponders, allowing a user to select the downlink footprints of more than two transponders based on the uplink frequency.

These and other objects of the present invention will be apparent to those of ordinary skill in the art after review of the detailed description, the drawings, and the claims.

DETAILED DESCRIPTION OF THE PREFERRED EMBODIMENT

Figure 1:
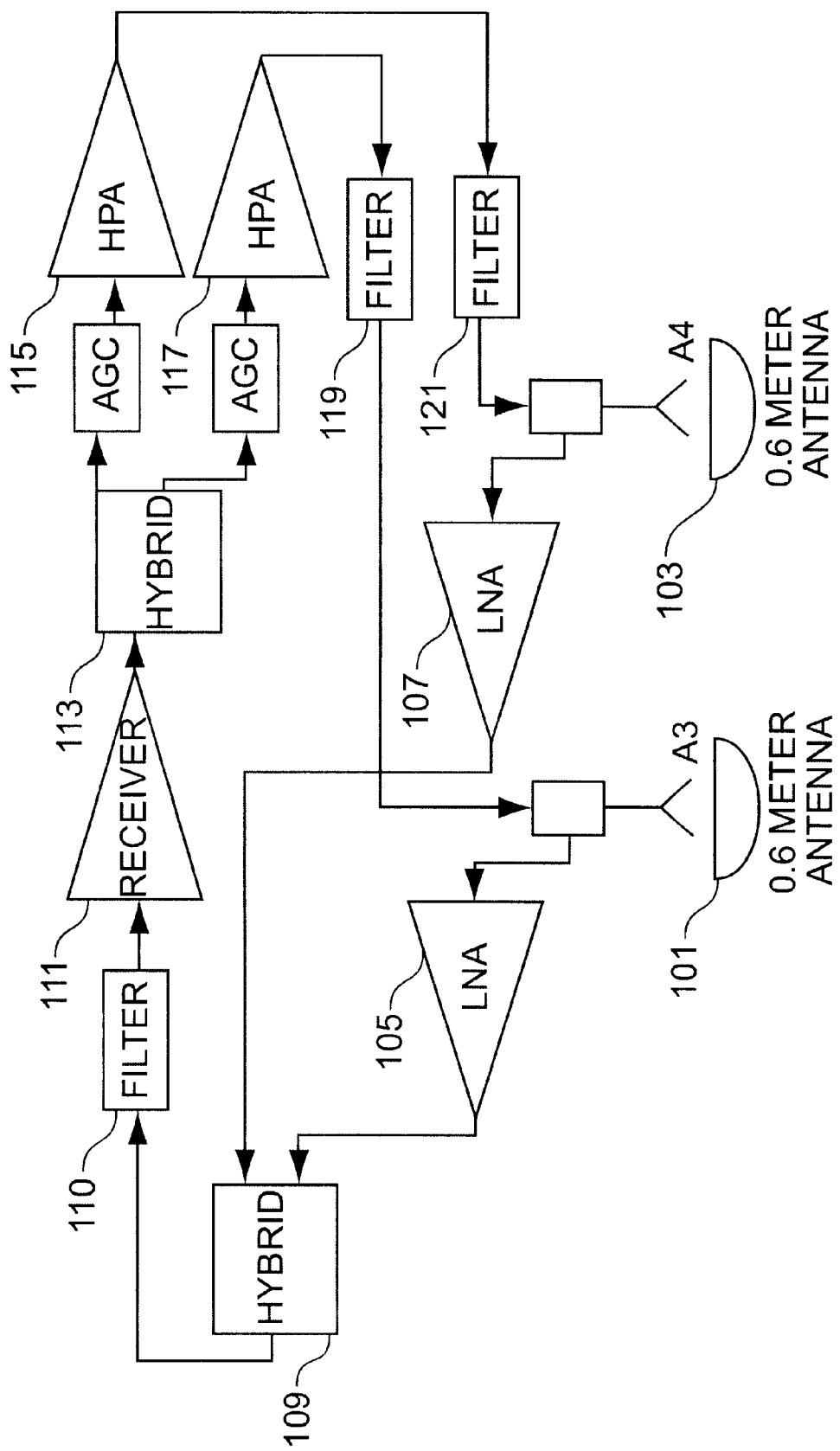
FIG. 1 shows a signal flow diagram of the satellite transponder in one embodiment of the present invention.
Figure 1A:
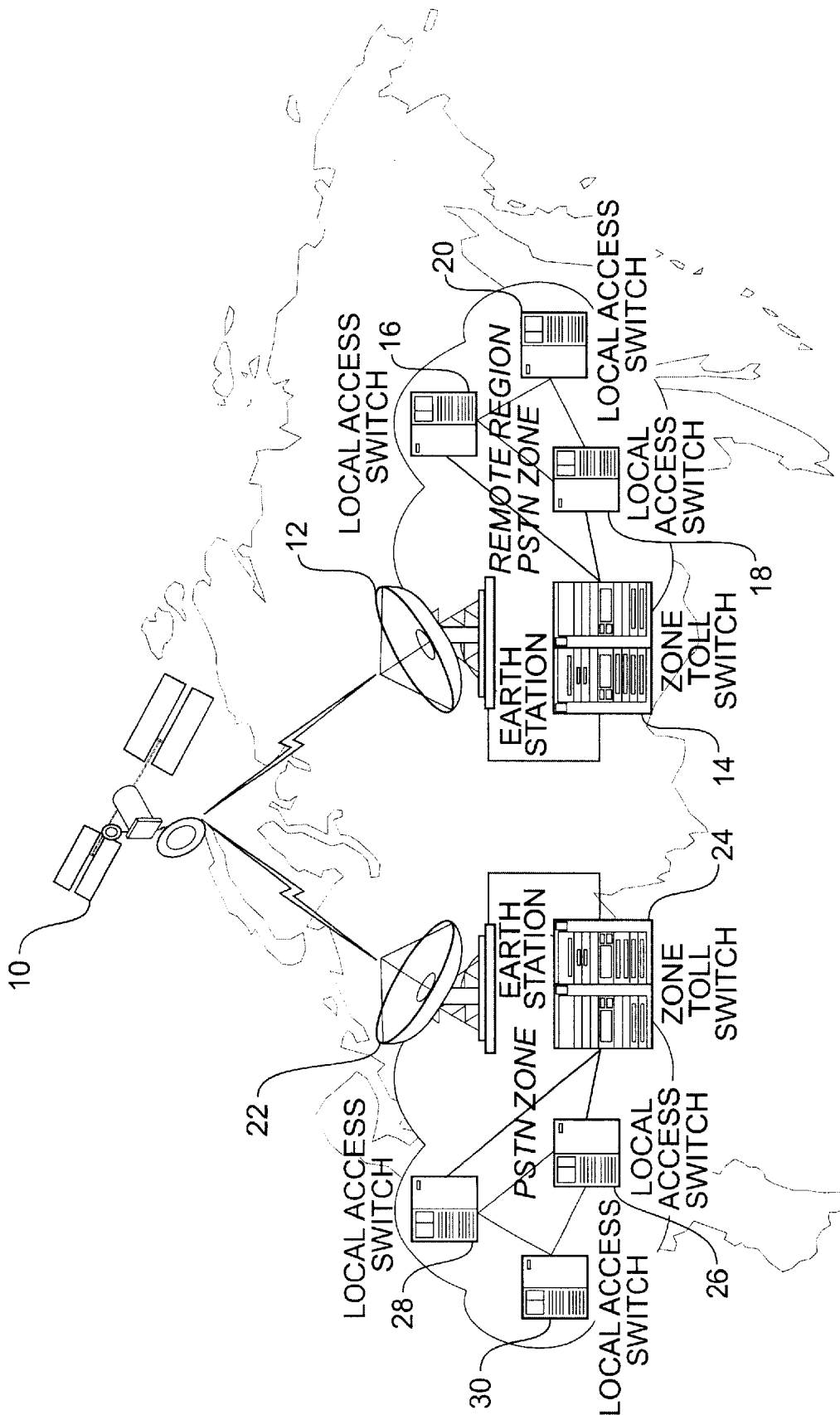
FIG. 1A shows an overview of the present invention.

Referring to FIG. 1A an overview of a single satellite and associated ground stations of the present invention are shown. Satellite 10 is stationed in a geosynchronous orbit thereby allowing the satellite to be stationary relative to a geographic location on the equator of the earth. The satellite communicates with earth station 12 which has a large diameter antenna designed to maximize efficiency of satellite communications. Connected to antenna 12 is a zone toll switch 14 which meters the usage of the satellite link and is the switch through which communications are made to various local public switched telephone networks, overlay networks, and private networks. The various local access switches 16, 18, and 20 are connected to the zone toll switch 14 and provide the access to various individuals and organizations in the local access area.

Earth station 12 may, for example and without limitation, communicate with earth station 22 that also comprises a relatively large diameter earth station antenna, again maximizing the efficiency and use by the earth station of satellite power. Earth station 22 is further connected to another zone toll switch 24 also connected generally to another public switched telephone network zone. Once again access of local customers is through a series of local access switches 26, 28, and 30.

Figure 1B:
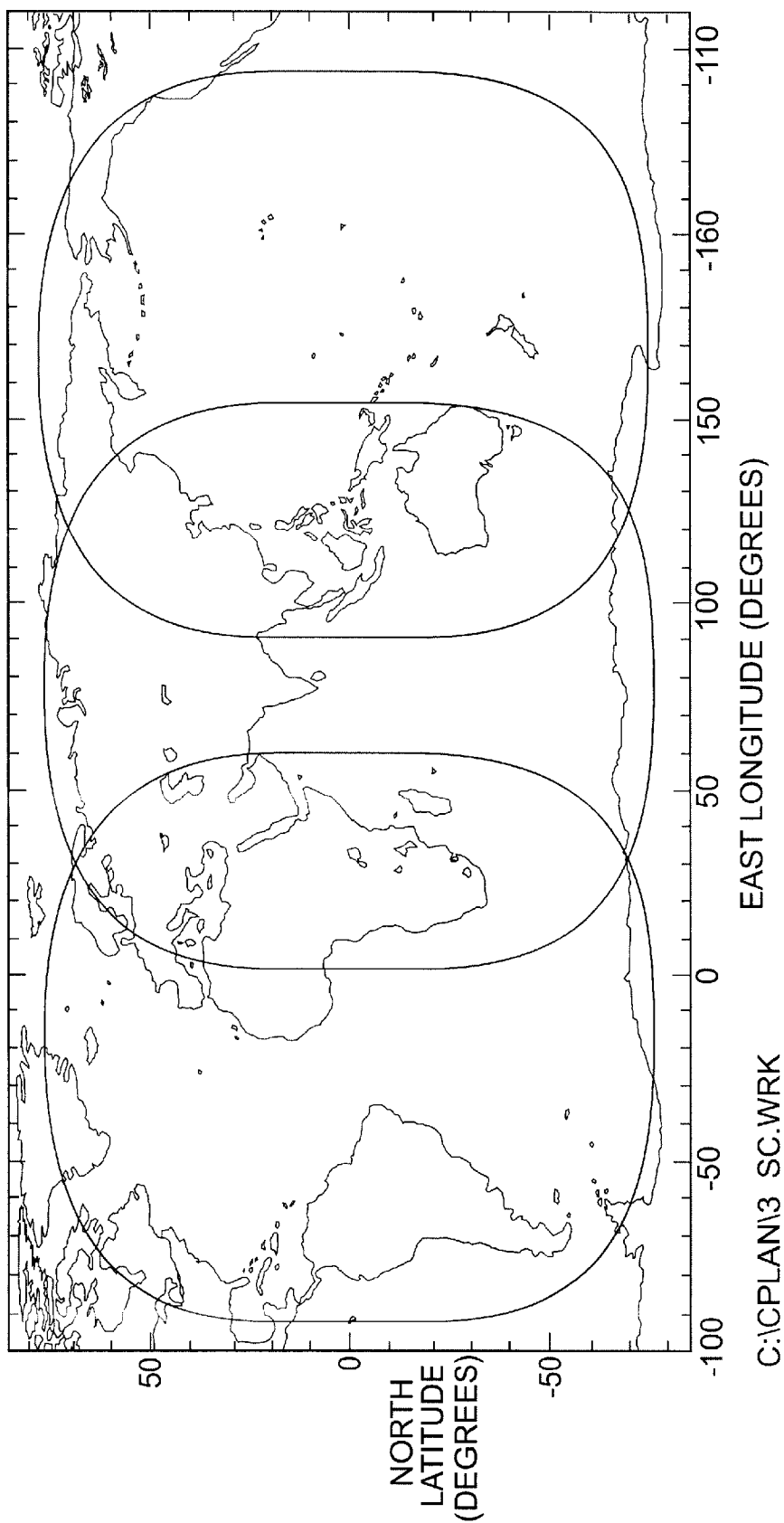
FIG. 1B shows satellite locations for satellites of the present invention.

Referring to FIG. 1B the satellite field-of-view areas of the three satellites of the present invention and their orbital locations are shown. In general concept, and without limitation, the present invention requires three satellites for virtually worldwide coverage. The satellites are stationed each in a geosynchronous orbit over ground locations at the equator at 16 degrees West, 77 degrees East, and 167 degrees East Longitude.

Figure 1C:
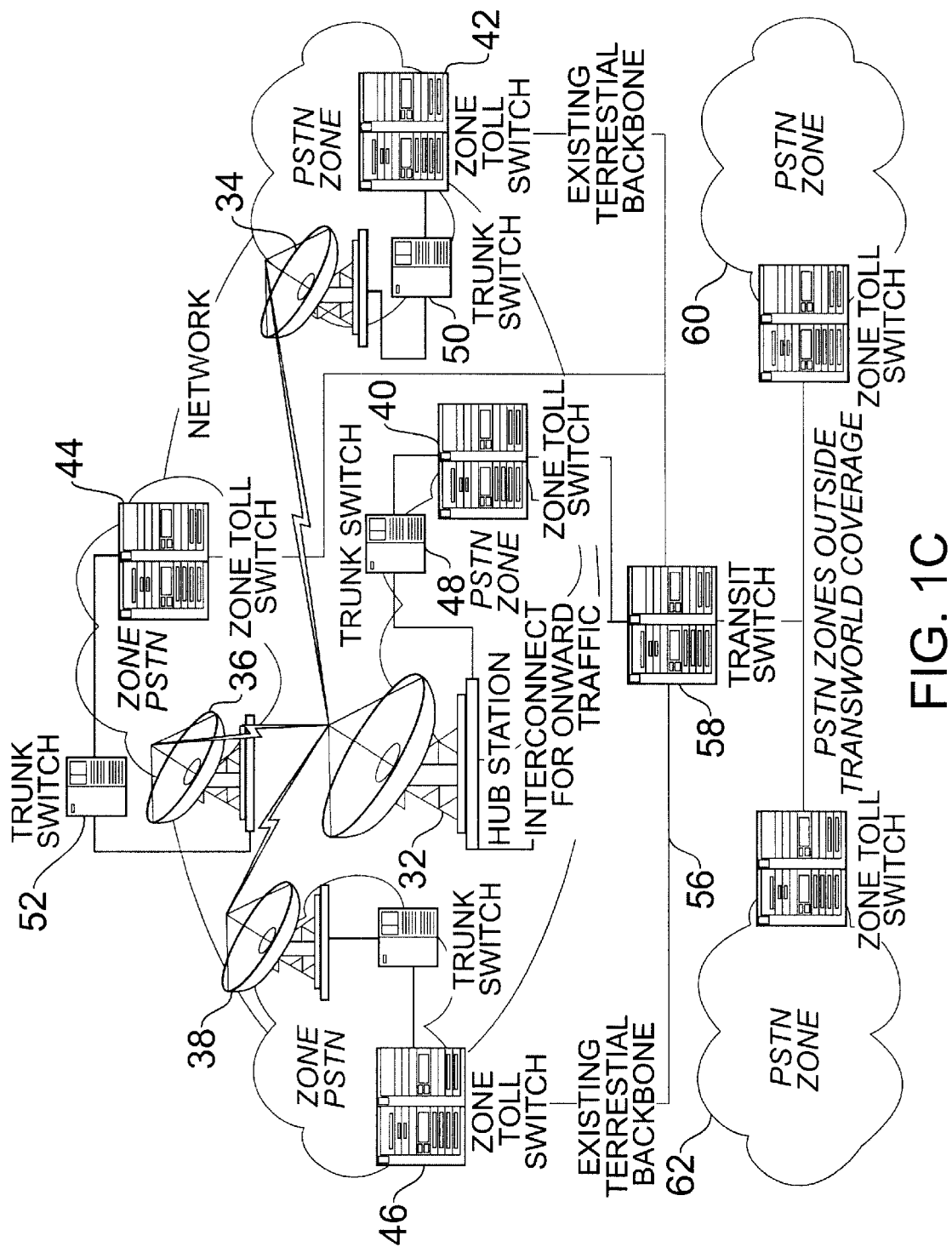
FIG. 1C shows PSTN backbone service of the present invention.

Referring to FIG. 1C the public switched telephone network backbone service is shown. In general concept, and without limitation, four earth stations 32, 34, 36, and 38 are shown. Again each earth station has a relatively large diameter antenna to maximize the efficiency of communications with the satellites of the present invention. Again each earth station has an associated zone toll switch 40, 42, 44, and 46. Further, trunk switches 48, 50, 52 and 54 are directly connected to each earth station antenna and provide the basis for switching and communications being sent and received over that segment of the digital trunking network.

The system of the present invention can also interact with the existing terrestrial backbone 56 thereby providing alternative communication means to the existing terrestrial backbone. Communications can thus be carried over the backbone 56 where appropriate or over the high-capacity digital satellite trunking network of the present invention. A transit switch 58 is also provided to allow communications with PSTN zones 60 and 62 which may be outside the zone of coverage of the present invention, that is, in regions not covered by the satellite footprint.

Figure 1D:
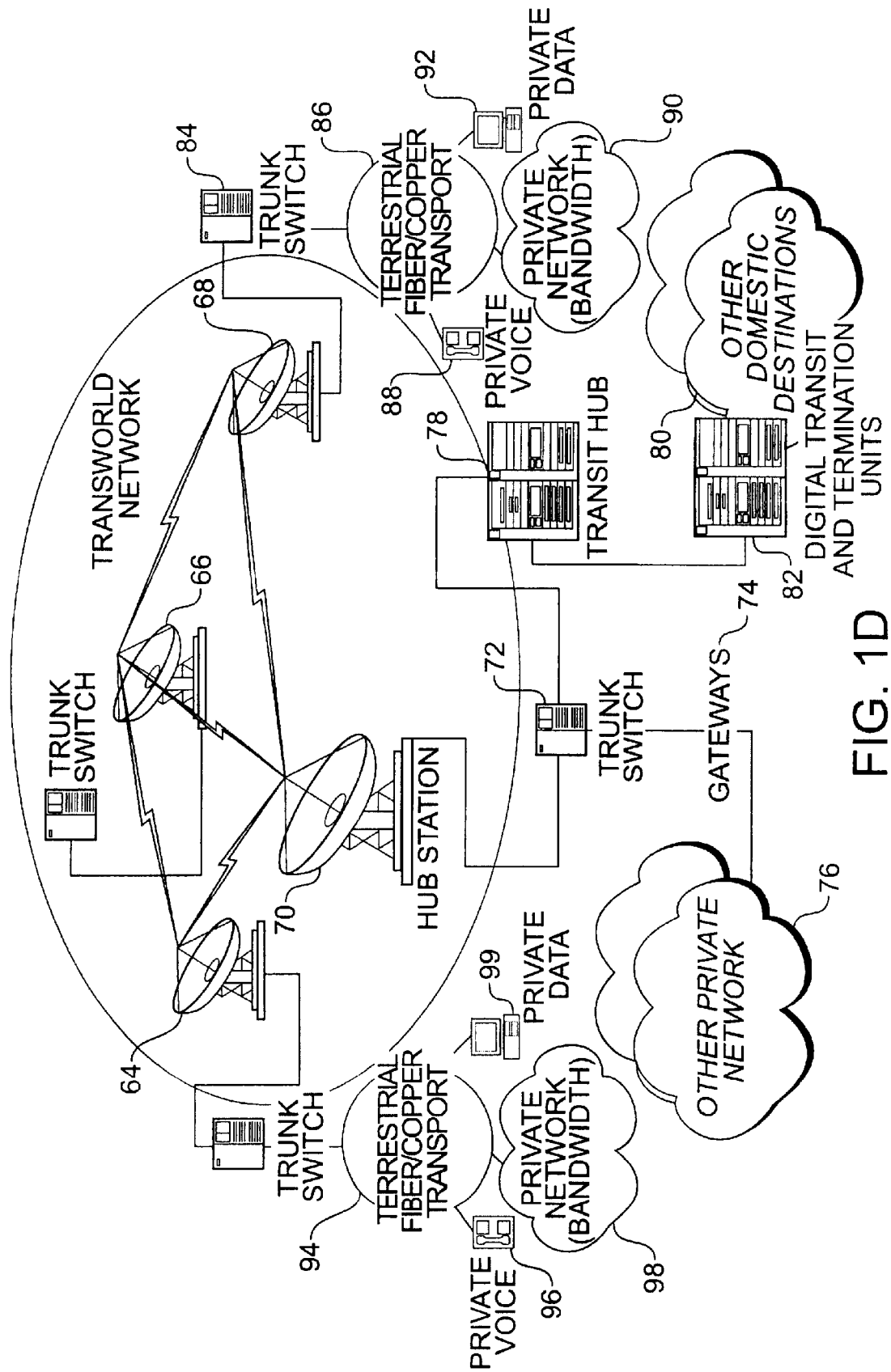
FIG. 1D shows the present invention providing dedicated services.

Referring to FIG. 1D, other dedicated services which can be serviced by the present invention are shown. Satellite earth stations 64, 66, 68, and 70 interact with the satellite of the present invention to provide the high-capacity digital satellite trunking network. Earth station 70 is linked in via its associated trunk switch 72 to various other gateways 74. These gateways provide access to other private communications networks 76. Transit hub 78 provides access to various other local destinations 80 via associated transit and termination units 82. These other domestic destinations 80 may be outside the satellite footprint or simply not be directly connected to an individual earth station of the present invention.

Earth station 68 is connected via its associated trunk switch 84 to a terrestrial fiber-optic or copper transport network 86. Individual private voice 88, a private network 90, or private data access 92 may be connected to this terrestrial network 86.

This flexible connection to terrestrial fiber-optic or copper transport networks can be duplicated at any other ground station location. Accordingly, a second terrestrial network 94 may also have private voice 96, private network 98, private data 99, connected to it. Thus, the present invention allows data, private networks or any other communications to be connected across broad geographic areas to other terrestrial fiber-optic copper or copper transport networks.

Figure 1E:
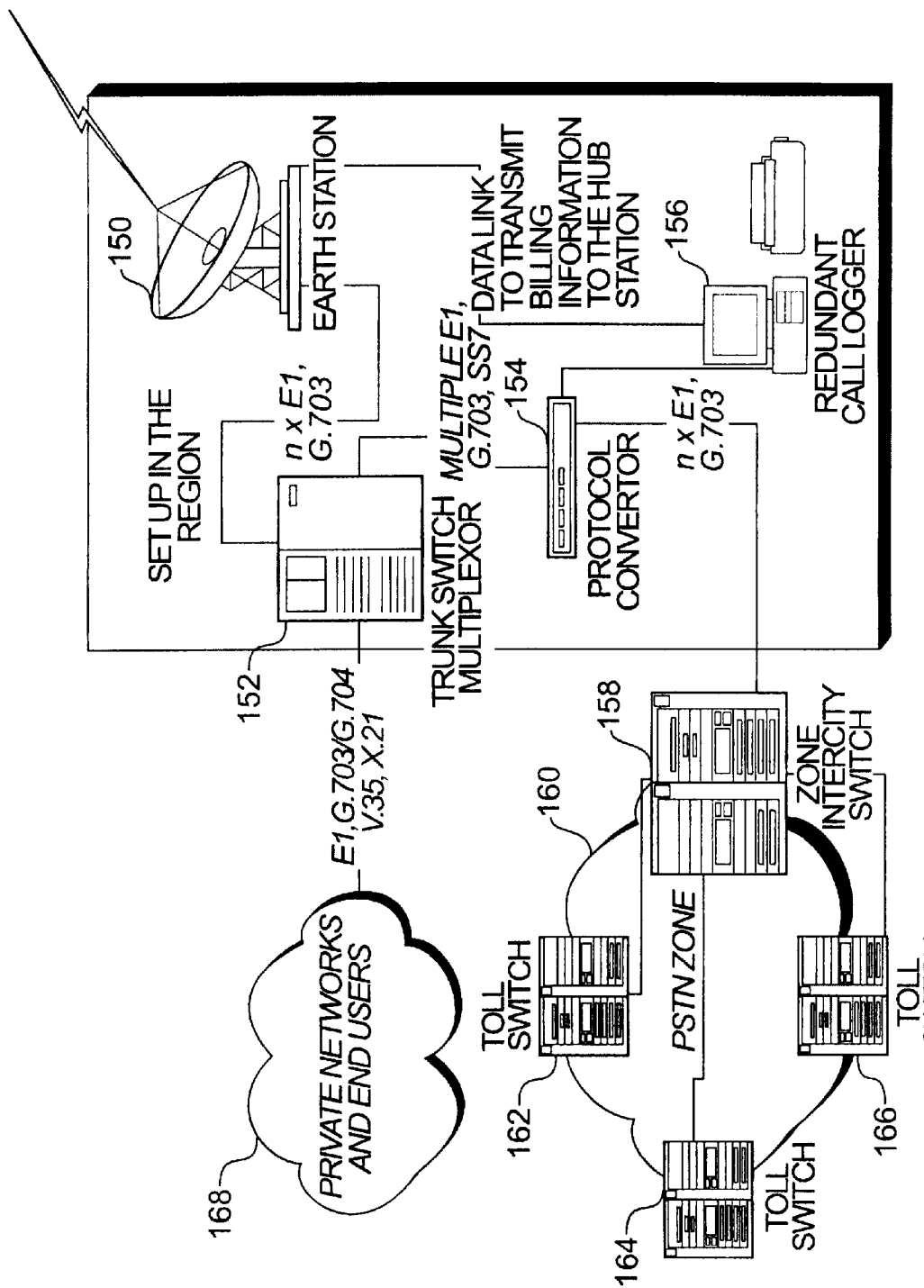
FIG. 1E shows regional setup of the present invention.

Referring to FIG. 1E a typical configuration at any given communication region of the present invention is shown. This is the type of installation that is associated with a ground station in communication with a satellite of the present invention. Earth station 150, with its large diameter antenna is connected to a trunks switch multiplexer 152. This multiplexer allows communications from a variety of different sources to be multiplexed and transmitted over the earth station to maximize utilization of bandwidth. A private network 168 may be directly connected to the trunk switch multiplexer. It should be noted that in this specific example no protocol conversion is needed between the private network or end-user and the trunk switch multiplexer.

However, the system of the present invention is capable of protocol conversion in situations where communications are originating from other countries, or other regions that simply use different protocols. For example, communications via toll switches 162, 164, and 166 may occur from a given PSTN zone 160. These communications are transmitted through a zone switch 158 to the earth station or over the terrestrial backbone. If the protocol is not the same, protocol converter 154 converts the incoming communications having a different protocol. Thereafter signals in communications are connected to the trunk switch multiplexer and are transmitted over the high-capacity digital satellite trunking network of the present invention.

Each regional earth station also incorporates a redundant call logger 156 which allows the transmission of billing information regarding utilization of the network to the hub station. This billing information is also transmitted at various times, and on a non-interference basis with communications being transmitted over the network.

Referring to FIG. 1, a signal flow diagram of the satellite transponders in one embodiment is illustrated. Two independently steerable satellite antennas 101, 103 are provided which can be boresighted to provide different earth footprints. The received signal from each satellite antenna is amplified by a low noise amplifier (LNA) 105, 107 prior to signal combination in a hybrid signal combiner 109. The combined signal is then filtered 110 and input to a wideband receiver 111 where the uplink frequency is shifted or translated to the downlink frequency. The translated frequency is then split by a hybrid signal splitter 113 into two signal paths before each is amplified by a high power amplifier (HPA) 115, 117. Each signal is then filtered 119, 121 and passed to the corresponding satellite antenna 101, 103 for re-transmission on the corresponding downlink frequency.

Figure 2:
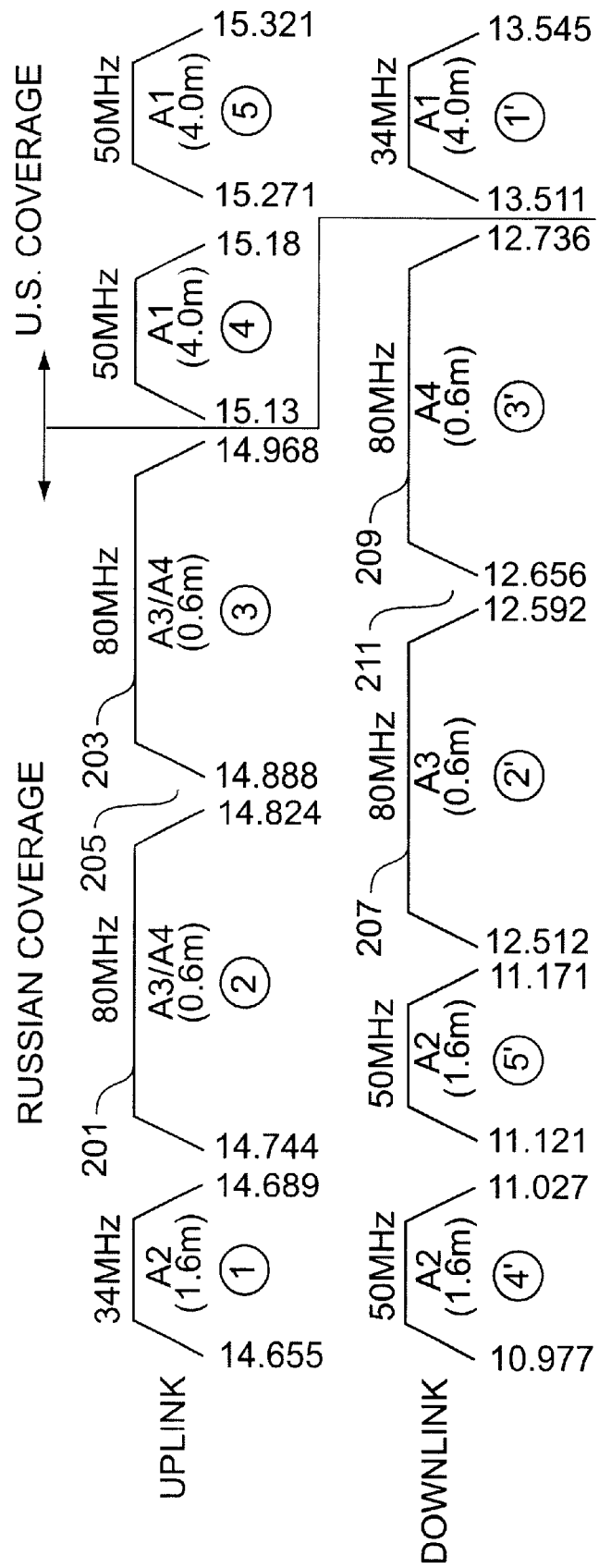
FIG. 2 shows an example of the frequency allocation used in one embodiment of the present invention.

Referring to FIG. 2, an example of frequency allocation for one embodiment is illustrated. Two 80 MHZ uplink frequency bands 201, 203 are shown, with a 64 MHZ separation frequency band 205. Two 80 MHZ downlink frequency bands 207, 209 are also shown, with a corresponding 64 MHZ separation frequency band 211. The downlink frequency for antenna 101, in FIG. 1, is the lower 80 MHZ band 207 (approximately 12.512 to 12.592 GHZ)

while the downlink frequency for antenna 103 is the upper 80 MHZ band 209 (approximately 12.656 to 12.736 GHZ).

Figure 3:
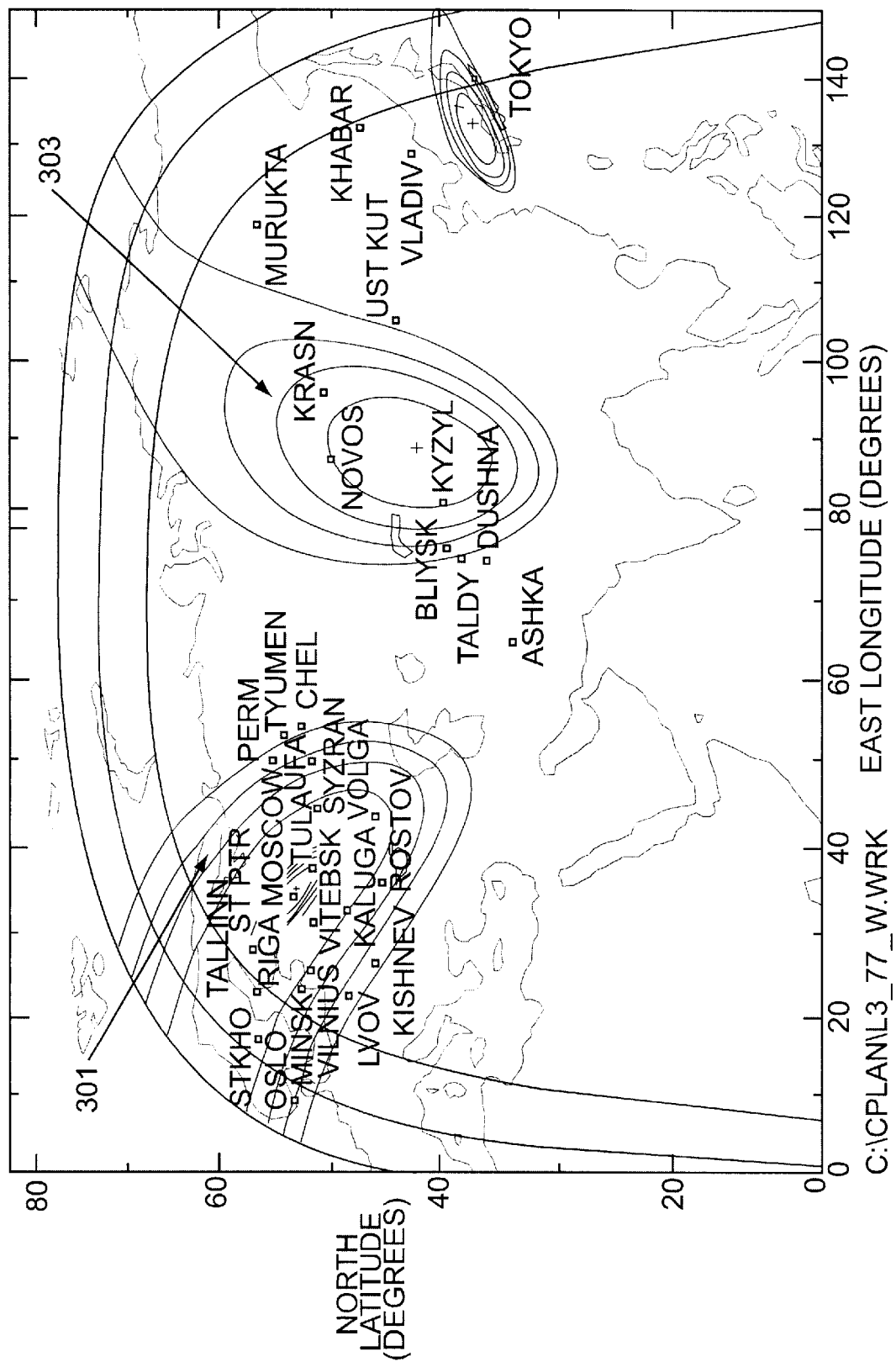
FIG. 3 shows an example of satellite antenna footprints in one embodiment of the present invention.

Referring now to FIG. 3, examples of satellite antenna footprints for different transponders are illustrated. The footprint for one antenna (101 in FIG. 1) covers one geographic area 301, while the footprint of the other antenna (103 in FIG. 1) covers another geographic area 303. Using this embodiment of the present invention, a first user, located within satellite antenna footprint 301, can communicate with a second user also located in satellite antenna footprint 301. Alternatively, a first user, located within satellite antenna footprint 301, can communicate with a third user located in satellite antenna footprint 303.

Figure 4:
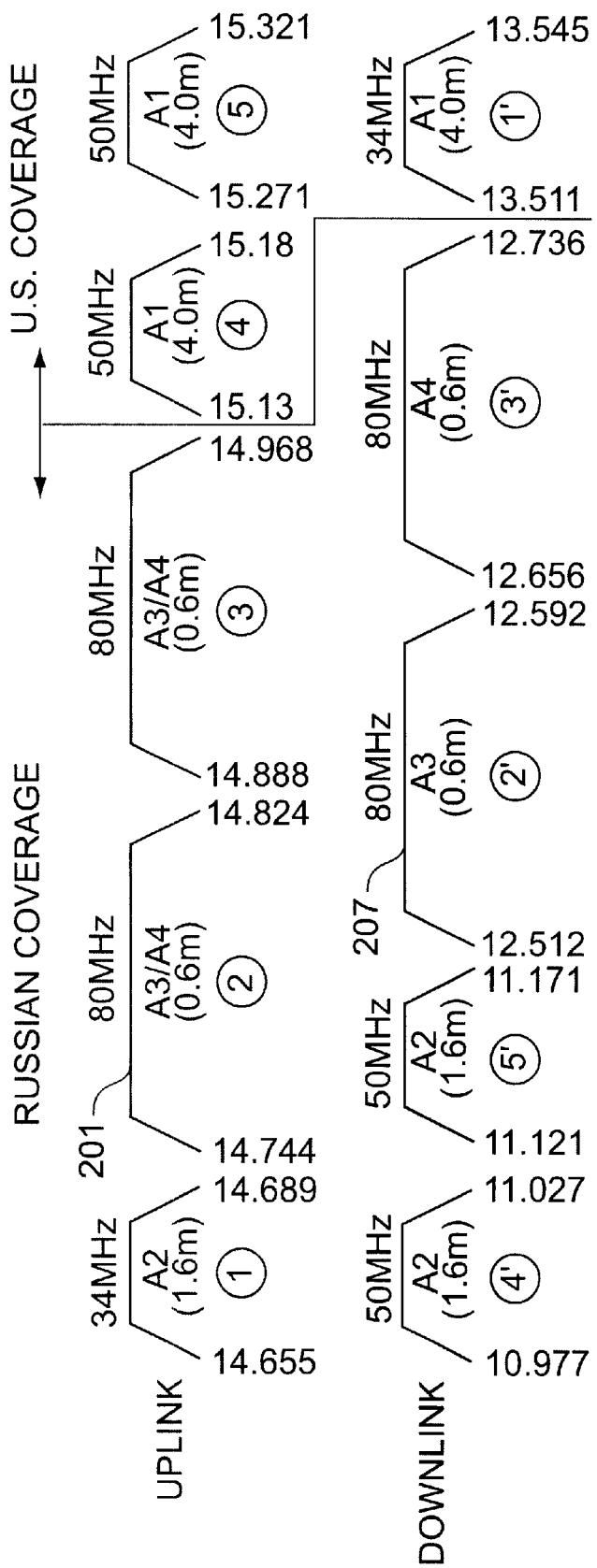
FIG. 4 shows an example of the uplink and downlink signals with users in the same satellite antenna footprint.

Referring now to FIG. 4, examples of the uplink and downlink signals are shown for users who are both in satellite antenna footprint 301 (FIG. 3) of satellite antenna 101 (FIG. 1). Here, the uplink signal is in the lower of the two 80 MHZ bands 201 (approximately 14.744 to 14.824 GHZ) and the downlink signal is also in the lower of the two 80 MHZ bands 207 (approximately 12.512 to 12.592 GHZ).

Figure 5:
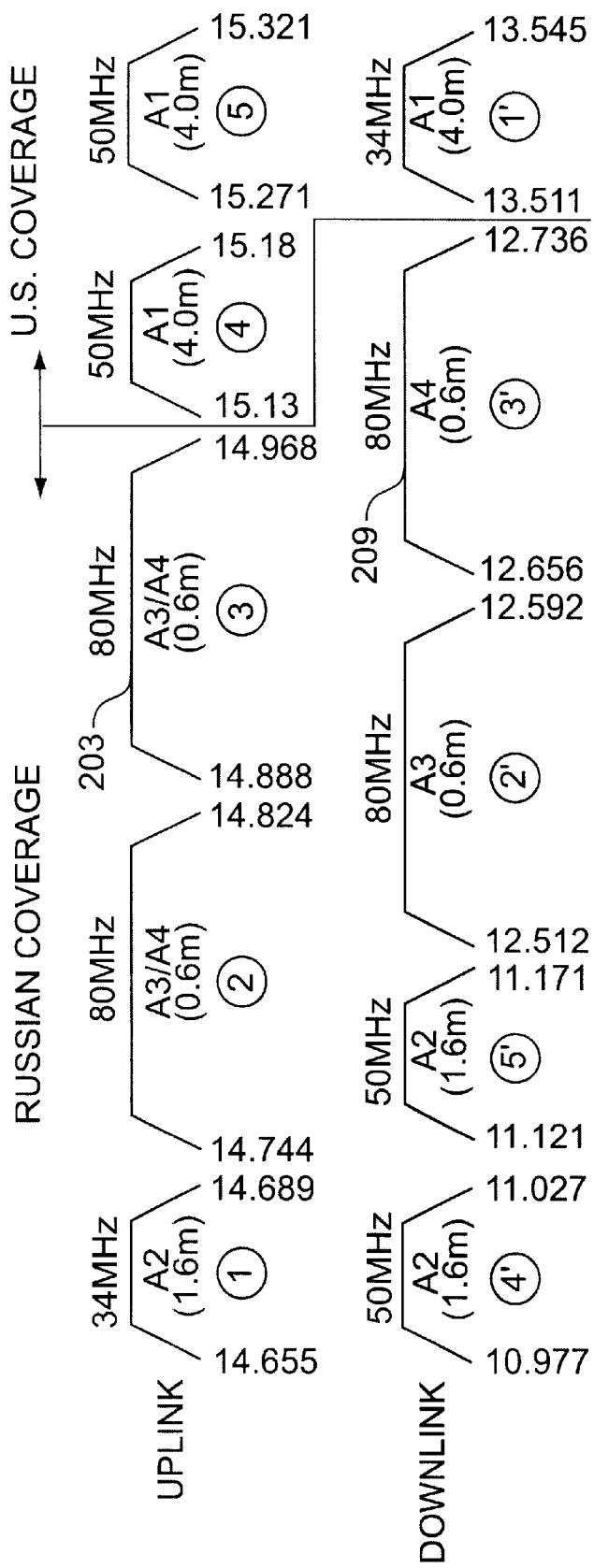
FIG. 5 shows an example of the uplink and downlink signals with users in different satellite antenna footprints.

Referring to FIG. 5, examples of the uplink and downlink signals are shown for users who are in different satellite antenna footprints. In this example, the transmitting user is in the satellite antenna footprint 301 (FIG. 3) of antenna 101 (FIG. 1), while the receiving user is in the satellite antenna footprint 303 (FIG. 3) of antenna 103 (FIG. 1). Here, the uplink signal is in the upper of the two 80 MHZ band 203 (approximately 14.888 to 14.968 GHZ) and the downlink signal is in the upper of the two 80 MHZ bands 209 (approximately 12.656 to 12.736 GHZ).

Referring back to FIGS. 1 and 2, in this embodiment, both antennas (101, 103 in FIG. 1) and LNAs (105, 107 in FIG. 1) have sufficient bandwidth to pass both 80 MHZ bands (201, 203 in FIG. 2) in addition to a 64 MHZ band separation (205 in FIG. 2) into the hybrid signal combiner (109 in FIG. 1). This approximately 224 MHZ bandwidth output of the hybrid signal combiner (109 in FIG. 1) is processed by a wideband receiver (111 in FIG. 1), which performs a frequency translation from the uplink to downlink frequency. The translated frequency output of the wideband receiver is then split into two 80 MHZ downlink signals (207, 209 in FIG. 2) before amplification by two HPA's (115, 117 in FIG. 1) and transmission through the two antennas (101, 103 in FIG. 1). In this example, one transponder downlink antenna (101 in FIG. 1) uses the lower frequency band (207 in FIG. 2) of the two 80 MHZ bands, and the other transponder downlink antenna (103 in FIG. 1) uses the upper frequency band (209 in FIG. 2) of the two 80 MHZ bands. Both transponders are thus able to receive both 80 MHZ bands (201, 203 in FIG. 2).

Completing the example, a transmitting user in the satellite antenna footprint of one transponder (301 in FIG. 3) who wants to communicate with another receiving user also in the satellite antenna footprint of the same transponder (301 in FIG. 3) will uplink in the lower frequency band (201 in FIG. 4) of the two 80 MHZ uplink bands. When the uplink frequency is translated to the downlink frequency, the downlink frequency will also be in the lower frequency band (207 in FIGS. 2 & 4) of the two 80 MHZ downlink bands. Alternatively, a transmitting user in the satellite antenna footprint of the first transponder (301 in FIG. 3) who wants to communicate with a second receiving user who is in the satellite antenna footprint of the second transponder (303 in FIG. 3) will uplink in the upper frequency band (203 in FIGS. 2 & 5) of the two 80 MHZ uplink bands. When the uplink frequency is translated to the downlink frequency, the downlink frequency will now be in the upper frequency band (209 in FIGS. 2 & 5) of the two 80 MHZ downlink bands. This will have the same effect as "cross-strapping" the two transponders would have in the traditional method of operation but without electrically tying the two transponders together.

Figure 6:
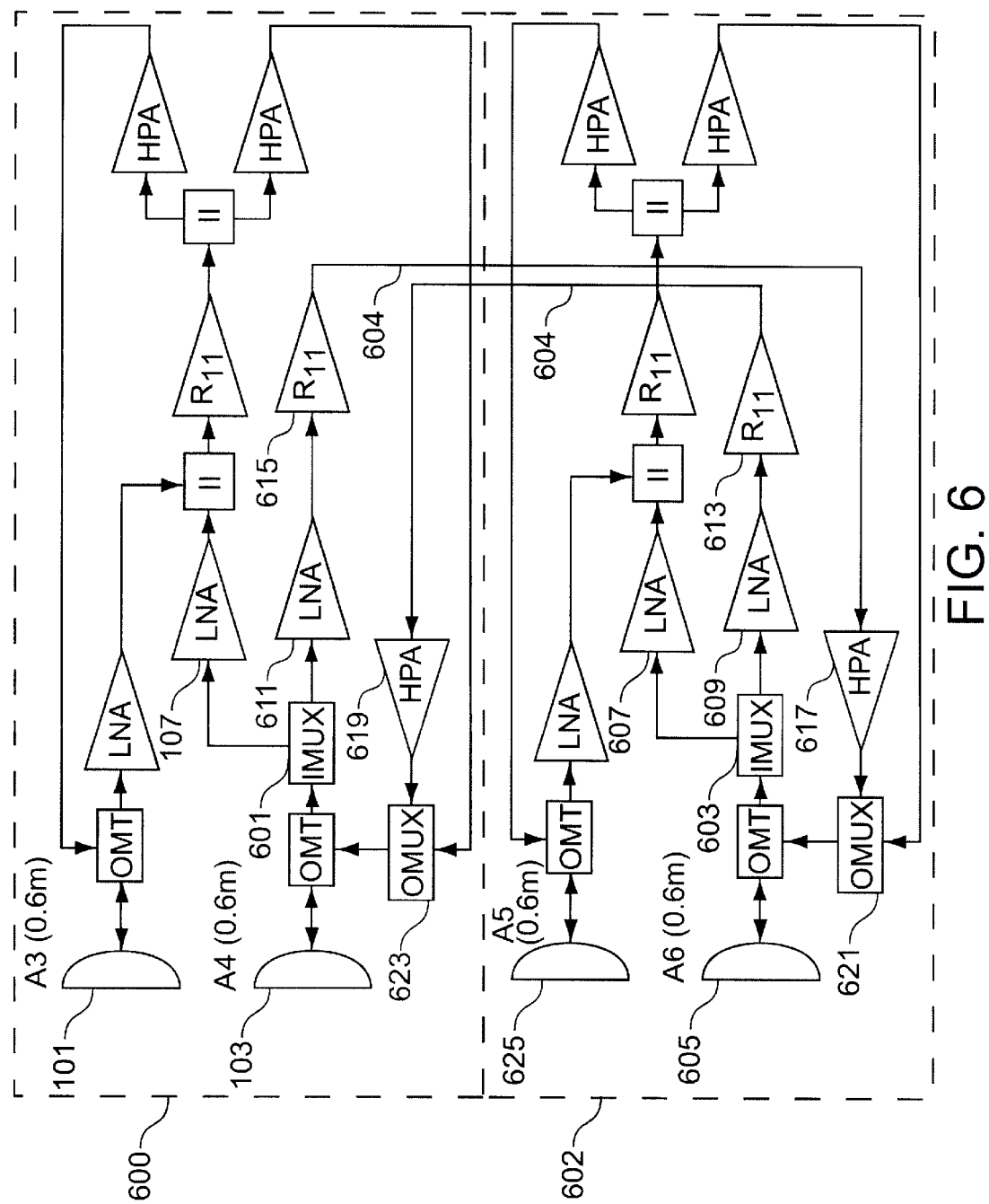
FIG. 6 shows a signal flow diagram of the satellite transponders in another embodiment of the present invention.

Referring now to FIG. 6, the signal flow of another embodiment of the present invention is illustrated. This arrangement uses the transponder pair of the first embodiment 600 and adds another transponder pair 602 and further allows users to cross signals between the transponder pairs 604. In this configuration, a multiplexer, IMUX 601, 603 is interposed in the signal path between the antenna 103, 605 and the low noise amplifiers 107, 607. The IMUX provides an alternative signal path that allows signals to be crossed between the transponder pairs 600, 602. After frequency splitting by the IMUX 601, 603, the signal path is similar to the first embodiment. Specifically, the signal is amplified by an LNA 609, 611, followed by a receiver 613, 615 which translates the uplink frequency to the downlink frequency. The frequency translated signals are then amplified by an HPA 617, 619 prior to another multiplex operation OMUX 621, 623 and final transmission by the respective antennas 103, 605.

Figure 7:
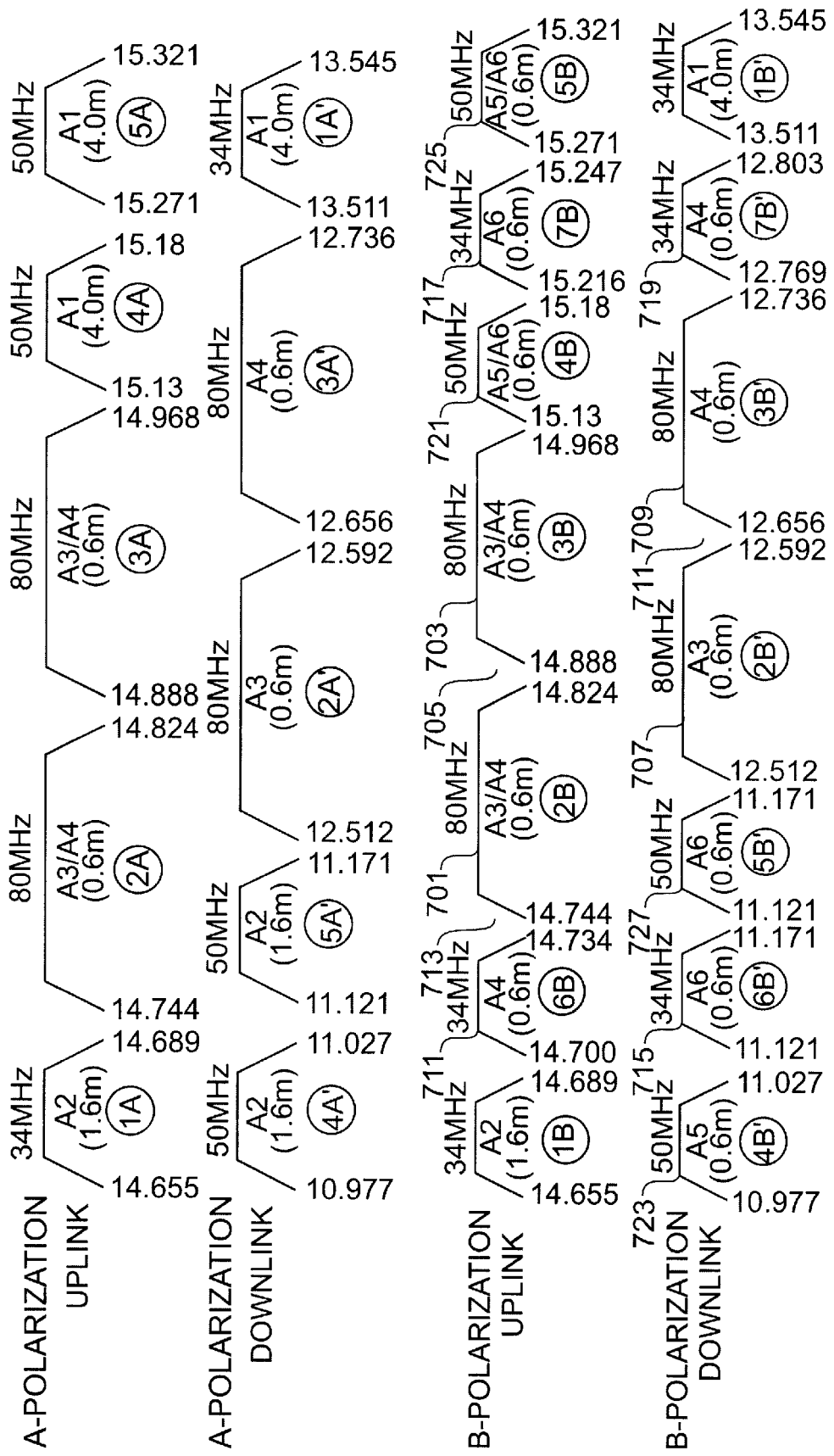
FIG. 7 shows an example of the frequency allocation used in another embodiment of the present invention.

An example frequency allocation that corresponds to this other embodiment is illustrated in FIG. 7. In addition to the technique of the first embodiment, using an orthogonal polarization, the uplink antenna (103 in FIG. 6) is able to receive and pass two 80 MHZ bands 701, 703, with a 64 MHZ separation band 705. These two 80 MHZ bands are received and translated to the downlink frequencies 707, 709 as in the first embodiment. However, the bandwidth that is passed through the uplink antenna (103 in FIG. 6) to the IMUX (601, 603 in FIG. 6) also includes a 34 MHZ band 711 in addition to a 10 MHZ frequency separation band 713. In this example, this 268 MHZ wideband signal (34+10+80+64+80 MHZ) is divided by the IMUX (601, 603 in FIG. 6) into two signal paths. One signal path, the upper 224 MHZ, is handled as in the first embodiment. The other signal path, the lower 34 MHZ 711, is crossed to the other transponder pair (602 in FIG. 6). This 34 MHZ signal 711 (14.700 to 14.734 GHZ) is processed by the LNA (611 in FIG. 6) and the frequency is translated to the downlink frequency by a receiver (615 in FIG. 6). In the example, the 34 MHZ uplink frequency 711 is translated to the 34 MHZ downlink frequency 715 (11.057 to 11.091 GHZ) before it is amplified by the HPA (617 in FIG. 6) and multiplexed with other signals by the OMUX (621 in FIG. 6) and finally transmitted through the antenna (605 in FIG. 6).

The signal flow for transmission from the satellite antenna footprint of satellite antenna 605 to the satellite antenna footprint of satellite antenna 103 is similar to that from satellite antenna 103 to satellite antenna 605. However, the example frequency allocation is different. Referring to FIG. 7, the uplink frequency 717 (approximately 15.216 to 15.247 GHZ) and the downlink frequency 719 (approximately 12.769 to 12.803 GHZ) are 34 MHZ wide.

For a transmitting user in the satellite antenna footprint of satellite antenna 605 who wants to transmit to a receiving user in the satellite antenna footprint of satellite antenna 625, the uplink frequency will be 721 (approximately 15.130 to 15.180 GHZ) and the downlink frequency will be 723 (approximately 10.977 to 11.027 GHZ). A transmitting user in the satellite antenna footprint of satellite antenna 625 who wants to transmit to a receiving user in the satellite antenna footprint of satellite antenna 605, the uplink frequency will be 725 (approximately 15.271 to 15.321 GHZ) and the downlink frequency 727 (approximately 11.121 to 11.171 GHZ).

Referring again to FIG. 1, the hardware to accomplish the present invention must have certain capabilities. The independently steerable satellite antenna 101, 103, must each have sufficient pointing accuracy to track and maintain boresight at sufficient gain to provide the required performance. The low noise amplifier 105, 107 must have a flat response across the desired spectrum with sufficient gain to provide the required performance. The hybrid signal combiner 109 must be capable of receiving two signal sources and suitably combining them into a single composite signal (without adverse noise, attenuation or artifacts) sufficient-to provide the required performance. The filter 110 must have suitable cut-off and selectivity to provide the required performance. The wideband receiver 111 must be capable of translating the input signal frequency to the desired output signal frequency with sufficient gain to provide the required performance. The hybrid signal splitter 113 must be capable of dividing a single signal with specified bandwidth into multiple signals of specified bandwidth without adverse attenuation or artifact. The high power amplifiers 115, 117 must be capable of amplification across the input frequency spectrum with flat response. Finally, the filters 119, 121 must have suitable cut-off and selectivity to provide the required performance.

Referring again to FIG. 6, the hardware to accomplish the other embodiment of the present invention must have certain capabilities. The additional independently steerable satellite antenna 625, 605, must each have sufficient pointing accuracy to track and maintain boresight at sufficient gain to provide the required performance. The input multiplexer, IMUX 601, 603 which is interposed in the signal path after the antenna 103, 605 must have sufficient bandwidth to provide the required performance. The low noise amplifier 107, 607, 609 and 611 must have a flat response across the desired spectrum with sufficient gain to provide the required performance. The wideband receiver 613, 615 must be capable of translating the input signal frequency to the desired output signal frequency with sufficient gain to provide the required performance. The high power amplifiers 617, 619 must be capable of amplification across the input frequency spectrum with flat response. Finally, the output multiplexer, OMUX 612, 623 must have bandwidth to provide the required performance.

An embodiment of the present invention is an optimized integrated high capacity digital satellite trunking network comprising a satellite comprising power and bandwidth, and having a plurality of transponders, a plurality of earth stations, the plurality of transponders and the plurality of earth stations constituting a communications network, means at each earth terminal for transmitting an uplink signal on an uplink frequency to one of the plurality of transponders on the satellite, and means at each earth terminal for receiving a downlink signal on a downlink frequency from one of the plurality of transponders. In this embodiment, each transponder translates an uplink signal to a downlink signal. The uplink signal may be translated to any downlink signal through use of a particular uplink frequency without modification or reconfiguration of the transponder means. In this embodiment, the full bandwidth and power of the satellite is used for the communications network. In an alternate embodiment, the optimized integrated high capacity digital satellite trunking network further comprises an uplink signal having a first center frequency and a downlink signal having a second center frequency such that the second center frequency is approximately 2.232. GHz less than the first uplink single center frequency.

In yet another embodiment, the optimized integrated high capacity digital satellite trunking network further comprises a signal combiner means on the satellite, a wideband receiver means on the satellite having a receiver bandwidth operating on the output of the signal combiner means, and a signal splitter on the satellite operating on the output of the wideband receiver means. In this embodiment, more than one of the uplink signals with the second center frequency are combined by the signal combiner means to create a hybrid signal with the second center frequency. The bandwidth of the wideband receiver means is at least as wide as the receiver bandwidth, and the signal splitter means converts the output signal of the wideband receiver means having the second center frequency to more than one downlink signal of the first bandwidth.

Another embodiment of the present invention is a method for providing an optimized integrated high capacity digital satellite trunking network comprising transmitting an uplink signal from a first of a plurality of earth stations on an uplink frequency to one of a plurality of transponders on a satellite having power and bandwidth characteristics, the plurality of earth stations and the plurality of satellite transponders constituting a communications network. The method further comprises receiving a downlink signal at a second of a plurality of earth stations on a downlink frequency from one of the plurality of transponders on the satellite and translating the uplink signal to the downlink signal using at least one of the plurality of satellite transponders. Using the method of this embodiment, the uplink signal may be translated to the downlink signal through use of a particular uplink frequency without modification or reconfiguration of the transponders. Additionally, the communications network uses the full power and bandwidth of the satellite. In an alternate embodiment, the method for providing an optimized integrated high capacity digital satellite trunking network further comprises translating the uplink signal having a first center frequency to the downlink signal having a second center frequency wherein the first center frequency is approximately a positive integer multiple, other than one, of the second center frequency.

In another embodiment of the present invention, in the method for providing an optimized integrated high capacity digital satellite trunking network, translating the uplink signal to the downlink signal comprises combining more than one uplink signal with a signal combiner means on the satellite, receiving the output of the signal combiner with a wideband receiver means, and splitting the output of the wideband receiver into more than one signal. In this embodiment, the uplink signals have a first center frequency and are combined to create a hybrid signal with the same first center frequency and the bandwidth of the wideband receiver is at least as wide as the first center frequency. Further, splitting the output of the wideband receiver means creates more than one downlink signal of a second center frequency which is less than the first center frequency.

Another embodiment of the present invention is an optimized integrated high capacity digital satellite trunking network comprising a first plurality of ground stations optimized to transmit communications in a first bandwidth, at least one communications satellite optimized to receive the communications from the plurality of ground stations in the first bandwidth, at least one communications satellite further transmitting the communications from the first plurality of ground stations in a second bandwidth and a second plurality of ground stations optimized to receive communications from the at least one communications satellite in the second bandwidth. The first plurality of ground stations, the second plurality of ground stations and the at least one communications satellite comprise a communications network. In this embodiment, the at least one communications satellite receives communications in only the first bandwidth and transmits communications in only the second bandwidth for optimizing power utilization of the at least one communications satellite. The communication network uses the full power and bandwidth of the at least one communications satellite. In an alternative embodiment, the at least one communications satellite comprises three communications satellites in geostationary orbit. By way of illustration and not as a limitation, the three communications satellites are respectively located at about 16 degrees West Longitude, at about 77 degrees East Longitude, and at about 167 degrees East Longitude.

An optimized integrated high capacity digital satellite trunking network has been described. Those skilled in the art will appreciate that minor variations may be made to the system described without departing from the scope of the invention as disclosed.

What is claimed is:

1. A method of communicating over a satellite, wherein the satellite comprises a plurality of antennas, each antenna characterized by an area of coverage in close proximity to the earth (an "antenna footprint") and configured to receive signals from an earth station and to transmit signals to an earth station within the footprint of that antenna the method comprising:

receiving at one of the plurality of antennas an uplink signal (an "uplink antenna"); based on the frequency of the uplink signal received at the uplink antenna, selecting from the plurality of antennas a downlink antenna;

selecting based on the downlink antenna a downlink signal frequency; converting the uplink signal frequency to the downlink signal frequency; and transmitting the downlink signal from the downlink antenna at the downlink frequency.

2. The method of claim 1 further comprising:

at a transmitting earth station, selecting from the plurality of antennas a downlink antenna the footprint of which includes the location of the transmitting earth station;

selecting at a transmitting earth station an uplink signal from a plurality of frequency bands wherein the uplink signal is associated with the selected downlink antenna; and transmitting from the transmitting earth station an uplink signal for reception by the receiving earth station.

3. The method of claim 2 wherein the transmitting earth station and the receiving earth station are located in the footprint of one of the plurality of antennas and wherein the uplink and downlink antennas are the same.

4. The method of claim 2 wherein the transmitting earth station is located in the footprint of one of the plurality of antennas and the receiving earth station is located in the footprint of another one of the plurality of antennas.

5. The method of claim 2 wherein the complete power and bandwidth of the satellite is allocated for a trunking network.

6. An optimized integrated high capacity digital satellite trunking network comprising:

a satellite comprising:

a plurality of transponders, wherein each of the plurality of transponders has associated therewith a receiver for receiving an uplink signal and a transmitter for transmitting a downlink signal, the transmitter characterized by a bandwidth limitation and an output power limitation;

a plurality of antennas wherein each antenna is characterized by an area of coverage in close proximity to the earth (an "antenna footprint") and is configured to receive an uplink signal from an earth station within the antenna footprint of that antenna and to transmit a downlink signal to an earth station within the antenna footprint of that antenna:

wherein the transmitter of each of the plurality of transponders is associated with one of the plurality of antennas; and an antenna selection plan wherein the frequency of the uplink signal determines the selection of the one of the plurality of antennas used to transmit the downlink signal; and a plurality of earth stations, the plurality of transponders and the plurality of earth stations comprising a communications network and wherein each earth station has a transmitter for transmitting an uplink signal and a receiver for receiving a downlink signal.

7. The optimized integrated high capacity digital satellite trunking network of claim 6 wherein the complete power and bandwidth of all of the plurality of transmitters is allocated for the trunking network.

8. The optimized integrated high capacity digital satellite trunking network of claim 6 wherein the uplink and downlink signals comprise multi-service telecommunications.

9. The optimized integrated high capacity digital satellite trunking network of claim 8 wherein the multi-service communication is taken from the group consisting of facsimile, voice, data, and video telecommunications.

10. The optimized integrated high capacity digital satellite trunking network of claim 9 wherein the voice telecommunications are public switched telephone network communications.

11. The optimized integrated high capacity digital satellite trunking network of claim 9 wherein the voice communications are private branch exchange telephone communications.

12. The optimized integrated high capacity digital satellite trunking network of claim 9 wherein the voice communications are overlay network service communications.

13. The optimized integrated high capacity digital satellite trunking network of claim 6 wherein the uplink signal is transmitted from, and the downlink signal received in, a single antenna footprint.

14. The optimized integrated high capacity digital satellite trunking network of claim 6 wherein the uplink signal is transmitted from a first antenna footprint in a first country and the downlink signal is received in a second antenna footprint in a second country.

15. The optimized integrated high capacity digital satellite trunking network of claim 14 wherein the network converts the telecommunications protocol from the first country to the telecommunications protocol for the second country.

16. The optimized integrated high capacity digital satellite trunking network of claim 6 wherein the uplink and downlink signals are taken from the group consisting of standard and non-standard telecommunications protocols.

* * * * *